United States Patent
Nakazawa

(10) Patent No.: US 9,459,914 B2
(45) Date of Patent: Oct. 4, 2016

(54) PROCESSING METHOD FOR CONTROL APPARATUS INVOLVES CONTROLLING JOB SUBSEQUENT TO PROCEEDING JOB BASED ON EXECUTION RESULT ACQUIRED BY EXECUTING THE PROCEEDING JOB

(75) Inventor: Toshiyuki Nakazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 13/516,721

(22) PCT Filed: Dec. 20, 2010

(86) PCT No.: PCT/JP2010/073647
§ 371 (c)(1),
(2), (4) Date: Jun. 15, 2012

(87) PCT Pub. No.: WO2011/083721
PCT Pub. Date: Jul. 14, 2011

(65) Prior Publication Data
US 2012/0257251 A1 Oct. 11, 2012

(30) Foreign Application Priority Data
Jan. 6, 2010 (JP) .................. 2010-001572

(51) Int. Cl.
*G06F 3/12* (2006.01)
*G06F 9/48* (2006.01)

(52) U.S. Cl.
CPC .................. *G06F 9/4843* (2013.01)

(58) Field of Classification Search
None
See application file for complete search history.

(56) References Cited

U.S. PATENT DOCUMENTS

| 5,987,181 | A | 11/1999 | Makiyama et al. |
| 8,169,640 | B2 | 5/2012 | Ooba |
| 8,171,074 | B2 | 5/2012 | Nakazawa |
| 8,400,658 | B2 | 3/2013 | Ito |
| 2004/0049531 | A1 | 3/2004 | Honda et al. |
| 2006/0259317 | A1 | 11/2006 | Nakazawa |
| 2008/0002226 | A1* | 1/2008 | Shigeeda ............ G06F 3/1204 358/1.15 |
| 2008/0239382 | A1* | 10/2008 | Matsueda ............ G06F 3/121 358/1.15 |

(Continued)

FOREIGN PATENT DOCUMENTS

| JP | 64-51895 A | 2/1989 |
| JP | 4-312131 A | 11/1992 |

(Continued)

OTHER PUBLICATIONS

Kojima, I., et al., An Architecture of Workflow System for Browser Based OGC Services, IEICE Tech. Report DE2009-11-DE2009-22 Data Engineering, vol. 109, No. 186, pp. 27-32, 2009 (with English abstract).

(Continued)

*Primary Examiner* — Vincent Rudolph
*Assistant Examiner* — Richa Mishra
(74) *Attorney, Agent, or Firm* — Fitzpatrick, Cella, Harper & Scinto

(57) ABSTRACT

A control apparatus controls execution of a job subsequent to a preceding job based on the results of executing the preceding job when executing a plurality of jobs cooperated as job cooperation. The control apparatus holds an execution result obtained by executing the preceding job; acquires the held execution result; and controls the job subsequent to the preceding job based on the acquired execution result.

18 Claims, 14 Drawing Sheets

(56) References Cited

U.S. PATENT DOCUMENTS

| | | | | |
|---|---|---|---|---|
| 2009/0172676 A1* | 7/2009 | Jiang | .................... | G06F 9/4843 718/101 |
| 2010/0070561 A1* | 3/2010 | Dhoolia | .................. | G06F 15/16 709/203 |
| 2010/0103458 A1* | 4/2010 | Negishi | ........................ | 358/1.15 |

FOREIGN PATENT DOCUMENTS

| | | | |
|---|---|---|---|
| JP | 5-80993 | A | 4/1993 |
| JP | 9-153815 | A | 6/1997 |
| JP | 2004-102449 | A | 4/2004 |
| JP | 2004-318763 | A | 11/2004 |
| JP | 2006-244172 | A | 9/2006 |
| JP | 2006244172 | A * | 9/2006 |
| JP | 2007-66144 | A | 3/2007 |
| JP | 2007-122189 | A | 5/2007 |
| JP | 2008-217299 | A | 9/2008 |
| JP | 2009-9455 | A | 1/2009 |
| JP | 2009-39913 | A | 2/2009 |
| JP | 2009039913 | A * | 2/2009 |
| JP | 2009-129340 | A | 6/2009 |
| JP | 2009-289283 | A | 10/2009 |
| JP | 2009-296242 | A | 12/2009 |

OTHER PUBLICATIONS

Japanese Office Action dated Nov. 18, 2013 issued in corresponding Japanese Patent Application No. 2010-001572.

* cited by examiner

FIG. 9

```
<?xml version = "1. 0" encoding = "utf-8" standalone = "yes"?>
<TaskResult>
    <TaskInformation>
        <ServiceName>Retrieve Address Book< / ServiceName>
        <TaskName>Retrive Address Book from Color MFPs< / TaskName>
        <StartTime>2009-05-22 05 : 11 : 41Z< / StartTime>
        <EndTime>2009-05-22 05 : 14 : 32Z< / EndTime>
    < / TaskInformation>
    < / SucceededDevices>
        <Device>
            <Id>00008523cd4d< / Id>
            <IPAddress>192. 168. 10. 12< / IPAddress>
        < / Device>
        <Device>
            <Id>000085437822< / Id>
            <IPAddress>192. 168. 10. 43< / IPAddress>
        < / Device>
    < / SucceededDevices>
    <FailedDevices>
        <Device>
            <Id>00008572dc23< / Id>
            <IPAddress>192.168.10.102< / IPAddress>
        < / Device>
    < / FailedDevices>
< / TaskResult>
```

FIG. 10

JOB 1

| | |
|---|---|
| JOB NAME | ADDRESS BOOK BACKUP ▼ |
| EXECUTION CONDITION FOR THE NEXT JOB | ○ EXECUTE THE NEXT JOB REGARDLESS OF EXECUTION RESULTS<br>◉ EXECUTE THE NEXT JOB IF THE EXECUTION RESULT IS AS FOLLOWS |
| EXECUTION RESULT | ■ NORMAL END   ■ PARTIAL END<br>□ ABNORMAL END  □ CANCEL |
| TARGET OF THE NEXT JOB | ◉ DEVICE SUCCESSFULLY PROCESSED BY THE JOB<br>○ DEVICE UNSUCCESSFULLY PROCESSED BY THE JOB<br>○ ALL THE DEVICES PROCESSED BY THE JOB<br>○ DEVICE IRRELEVANT TO THE PRESENT JOB |

JOB 2

| | |
|---|---|
| JOB NAME | ADDRESS BOOK SETTING ▼ |

[ADD THE JOB]

FIG. 11

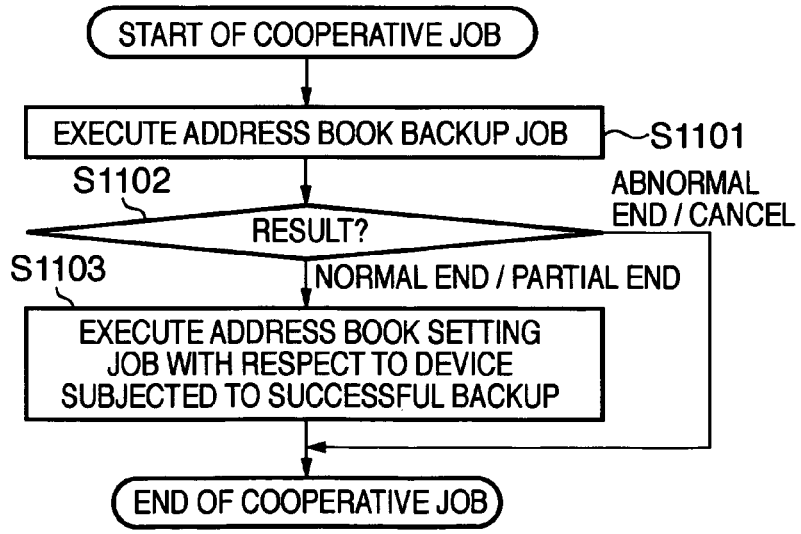

FIG. 12

JOB 1

| JOB NAME | FIRMWARE DELIVERY ▼ |
|---|---|
| EXECUTION CONDITION FOR THE NEXT JOB | ○ EXECUTE THE NEXT JOB REGARDLESS OF EXECUTION RESULTS<br>◉ EXECUTE THE NEXT JOB IF THE EXECUTION RESULT IS AS FOLLOWS |
| EXECUTION RESULT | ■ NORMAL END   ■ PARTIAL END<br>☐ ABNORMAL END   ☐ CANCEL |

JOB 2

| JOB NAME | ADDRESS BOOK BACKUP ▼ |
|---|---|
| TARGET OF THE JOB | ○ DEVICE SET FOR THIS JOB<br>◉ TARGET DEVICE OF THE PREVIOUS JOB |
| PREVIOUS JOB | JOB 1 ▼<br>◉ DEVICE SUCCESSFULLY PROCESSED BY THE JOB<br>○ DEVICE UNSUCCESSFULLY PROCESSED BY THE JOB<br>○ ALL THE DEVICES PROCESSED BY THE JOB |
| EXECUTION CONDITION FOR THE NEXT JOB | ◉ EXECUTE THE NEXT JOB REGARDLESS OF EXECUTION RESULTS<br>○ EXECUTE THE NEXT JOB IF THE EXECUTION RESULT IS AS FOLLOWS |
| EXECUTION RESULT | ■ NORMAL END   ■ PARTIAL END<br>☐ ABNORMAL END   ☐ CANCEL |

[DELETE THE JOB]

JOB 3

| JOB NAME | DEVICE REBOOT ▼ |
|---|---|
| TARGET OF THE JOB | ○ DEVICE SET FOR THIS JOB<br>◉ TARGET DEVICE OF THE PREVIOUS JOB |
| PREVIOUS JOB | JOB 1 ▼<br>◉ DEVICE SUCCESSFULLY PROCESSED BY THE JOB<br>○ DEVICE UNSUCCESSFULLY PROCESSED BY THE JOB<br>○ ALL THE DEVICES PROCESSED BY THE JOB |

[ADD THE JOB]

FIG. 13A

| JOB NUMBER | REGISTERED-JOB ID | EXECUTION CONDITION FOR NEXT JOB | TARGET DEVICE | JOB NUMBER OF TARGET DEVICE |
|---|---|---|---|---|
| 1 | 23 | NP | J | 0 |
| 2 | 42 | | S | 1 |
| 3 | 13 | | S | 1 |

FIG. 13B

| JOB NUMBER | SYSTEM ID | REGISTERED-JOB ID | EXECUTION CONDITION FOR NEXT JOB | TARGET DEVICE | JOB NUMBER OF TARGET DEVICE |
|---|---|---|---|---|---|
| 1 | 1 | 23 | NP | J | 0 |
| 2 | 2 | 42 | | S | 1 |
| 3 | 1 | 13 | | S | 1 |

FIG. 13C

| SYSTEM ID | NAME | URI |
|---|---|---|
| 1 | DEVICE MANAGEMENT SOFTWARE OF IT MANAGEMENT DEPARTMENT | https://localhost/NDM |
| 2 | DEVICE MANAGEMENT IN SECOND BUILDING | https://192.168.0.38/NDM |

FIG. 16

JOB 1

SYSTEM NAME: DEVICE MANAGEMENT SOFTWARE OF IT MANAGEMENT DEPARTMENT ▼

JOB NAME: FIRMWARE DELIVERY ▼

EXECUTION CONDITION FOR THE NEXT JOB
○ EXECUTE THE NEXT JOB REGARDLESS OF EXECUTION RESULTS
◎ EXECUTE THE NEXT JOB IF THE EXECUTION RESULT IS AS FOLLOWS

EXECUTION RESULT ■ NORMAL END ■ PARTIAL END ☐ ABNORMAL END ☐ CANCEL

JOB 2

SYSTEM NAME: DEVICE MANAGEMENT IN SECOND BUILDING ▼

JOB NAME: ADDRESS BOOK BACKUP ▼

TARGET OF THE JOB
○ DEVICE SET FOR THIS JOB
◎ TARGET DEVICE OF THE PREVIOUS JOB

PREVIOUS JOB: JOB 1 ▼

◎ DEVICE SUCCESSFULLY PROCESSED BY THE JOB
○ DEVICE UNSUCCESSFULLY PROCESSED BY THE JOB
○ ALL THE DEVICES PROCESSED BY THE JOB

EXECUTION CONDITION FOR THE NEXT JOB
◎ EXECUTE THE NEXT JOB REGARDLESS OF EXECUTION RESULTS
○ EXECUTE THE NEXT JOB IF THE EXECUTION RESULT IS AS FOLLOWS

EXECUTION RESULT ■ NORMAL END ■ PARTIAL END ☐ ABNORMAL END ☐ CANCEL

[ADD THE JOB]

LIST OF EXECUTED JOBS

| JOB NAME | STATUS | | EXECUTION DATE / TIME |
|---|---|---|---|
| ACQUISITION OF NETWORK SETTINGS | NORMAL END | | 2009 / 07 / 16 14 : 34 : 13 |
| ADDRESS BOOK BACKUP | ABNORMAL END | RECOVERY | 2009 / 07 / 16 15 : 17 : 33 |
| SAVING NETWORK SETTINGS | PARTIAL END | RECOVERY | 2009 / 07 / 16 17 : 03 : 19 |
| DEVICE SEARCH | NORMAL END | | 2009 / 07 / 16 20 : 51 : 51 |
| TOTALING NUMBER OF PRINTED SHEETS | CANCEL | | 2009 / 07 / 17 01 : 32 : 18 |

PROCESSING METHOD FOR CONTROL APPARATUS INVOLVES CONTROLLING JOB SUBSEQUENT TO PROCEEDING JOB BASED ON EXECUTION RESULT ACQUIRED BY EXECUTING THE PROCEEDING JOB

TECHNICAL FIELD

The present invention relates to a control apparatus and a processing method therefor, where the control apparatus controls execution of a job subsequent to a preceding job based on the results of executing the preceding job, when executing a plurality of jobs cooperated as job cooperation.

BACKGROUND ART

Conventional job management methods and job execution methods which apply details of the results of executing a preceding job to a subsequent job include pipeline processing used by a UNIX (registered trademark) shell and DOS commands. With pipeline processing, job execution result details outputted from a preceding job are connected to the input of a subsequent job.

Also, it has been proposed to apply the idea of pipeline processing to jobs executed by multiple computers on a network (e.g., Japanese Patent Laid-Open No. 2004-102449).

However, the conventional job management method which connects the output of the preceding job to the input of the subsequent job using pipeline processing has the following problems. Specifically, the conventional job management method cannot be applied to the determination of a job to be executed next based on an execution result, such as failure or success, of the preceding job. Also, the execution result details of a preceding job whose execution has already been finished cannot be applied to a subsequent job.

SUMMARY OF INVENTION

The present invention provides a method and apparatus which can apply the execution result details of a job which has already been executed to a subsequent job.

According to one aspect of the present invention, there is provided a processing method for a control apparatus which controls execution of a job subsequent to a preceding job based on results of executing the preceding job when executing a plurality of jobs cooperated as job cooperation, the method comprising: holding an execution result obtained by executing the preceding job; acquiring the execution result held by the holding step; and controlling the job subsequent to the preceding job based on the execution result acquired by the acquiring step.

Further features of the present invention will become apparent from the following description of exemplary embodiments (with reference to the attached drawings).

BRIEF DESCRIPTION OF DRAWINGS

FIG. 9 is a diagram showing an example of XML including job execution result details returned by network device management software using a REST Web service for acquiring execution result details;

FIG. 10 is a diagram showing an example of an UI used to define an execution method for a job cooperation processing unit 401 to execute multiple jobs;

FIG. 11 is a flowchart showing processing of two jobs executed via the exemplary UI shown in FIG. 10;

FIG. 12 is a diagram showing another example of an UI used to define an execution method for multiple jobs;

FIG. 13A is a diagram showing data (job cooperation definition data) which, being stored in a database 104, defines job cooperation; FIG. 13B is a diagram showing an example of data which, being stored in a database, defines job cooperation, according to a second embodiment; FIG. 13C is a diagram showing an example of database data which defines system IDs;

FIG. 16 is a diagram showing an extended version of the UI used to define an execution method for multiple jobs shown in FIG. 12, where the extended version allows a user to specify a job registered with different network device management software;

DESCRIPTION OF EMBODIMENTS

Embodiments of the present invention will be described in detail below with reference to the drawings. First, cooperative device job management will be described as an embodiment of cloud computing which allows computer processing by a computer on a network to be used as a service via the network.

First Embodiment

Figure 1:
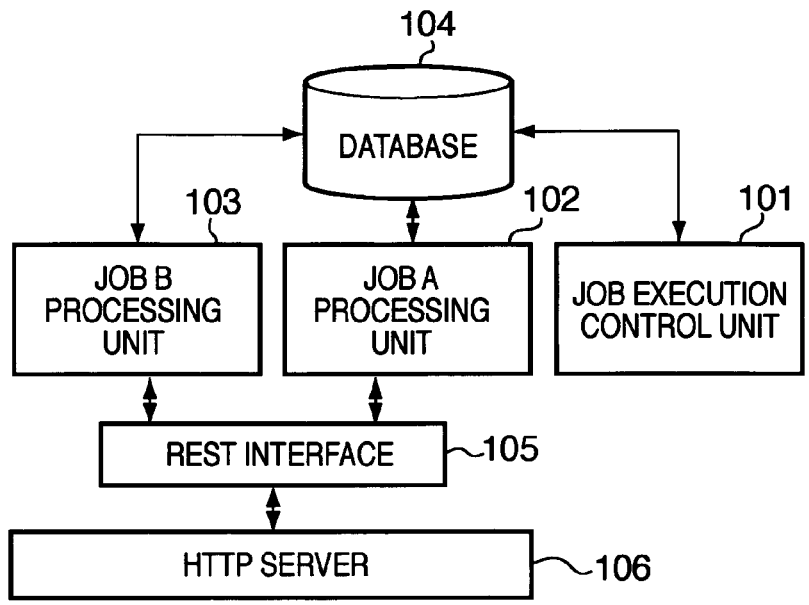
FIG. 1 is a block diagram showing a configuration based on a concept of a job management method according to a first embodiment.

FIG. 1 is a block diagram showing a configuration based on a concept of a job management method according to a first embodiment. In FIG. 1, a job execution control unit 101 controls the execution of multiple jobs. A job A processing unit 102 and job B processing unit 103 are controlled by the job execution control unit 101. The two job processing units process different types of job. For example, the job A processing unit 102 backs up an address book of multifunction peripherals while the job B processing unit 103 delivers firmware to printers. A database 104 stores execution conditions of multiple jobs, execution details of each job, and execution result details of each job.

A REST interface 105 receives a REST Web service call and calls functions corresponding to the job A processing unit 102 or job B processing unit 103. REST is a technique for specifying a resource using a URI without using SOAP and for acquiring or setting information using HTTP or HTTPS. An HTTP server 106 receives an HTTP or HTTPS request and, as required, calls the REST interface 105.

SOAP has high expandability, but is accordingly complex to develop and requires time to verify and guarantee operation. On the other hand, REST gives a unique URI to each resource using four HTTP methods: GET, POST, PUT, and DELETE. This makes it necessary to use as many different URIs as there are resources, but REST is easier to develop and check for operation than SOAP. Also, whereas typical HTTP communications need to keep a connection established while waiting for a response from a process, the use of REST eliminates this need.

That is, REST allows a state of asynchronous processing to be treated as a resource, which can then be created. Thus, a response to a process request can be produced at any time (asynchronously) without synchronizing the timing of the response with the process request. That is, asynchronous processing can be performed relatively easily by describing a resource using REST. The present invention features asynchronous processing using REST for cooperative device job management and cloud computing workflow.

Figure 2:
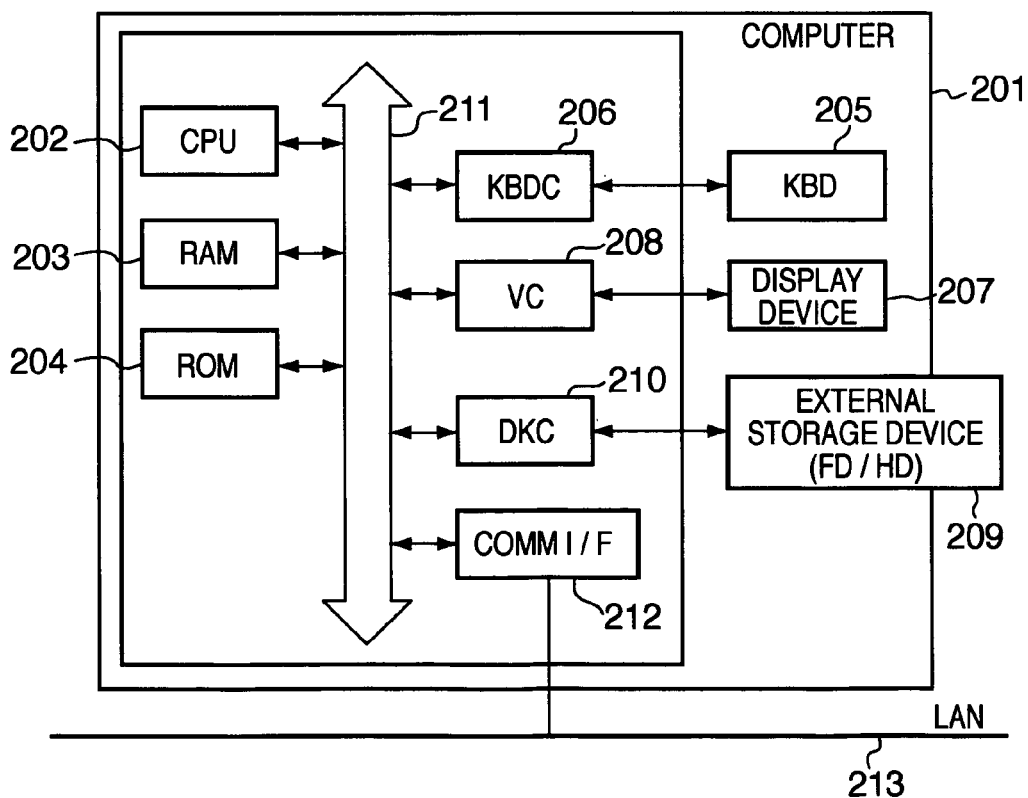
FIG. 2 is a block diagram showing a hardware configuration of a host computer which performs the job management method shown in FIG. 1.

FIG. 2 is a block diagram showing a hardware configuration of a host computer which performs the job management method shown in FIG. 1. The host computer 201 includes a CPU 202, RAM 203, ROM 204, and external storage device (FD/HD) 209. The host computer 201 executes software stored in the ROM 204 or external storage device 209 by loading the software into the RAM 203 and thereby collectively controls devices connected to a system bus 211. The RAM 203 functions as a main memory or work area for the CPU 202.

The external storage device 209 includes a hard disk (HD), flexible disk (FD), and the like. The external storage device 209 stores various applications, database data, and user files, where the applications include a boot program, operating system, authentication sever, and authentication client.

The system bus 211 is connected with a keyboard controller (KBDC) 206 used to output input information from a keyboard (KBD) 205 or a pointing device (not shown) such as a mouse to the CPU 202. Also, the system bus 211 is connected with a video controller (VC) 208 and disk controller (DKC) 210, where the video controller 208 controls display on a display device 207 such as a CRT or liquid crystal panel and the disk controller 210 controls access to the external storage device 209. Furthermore, the system bus 211 is connected with a communications controller (COMM I/F) 212 which controls connection with a local area network (LAN) 213.

Figure 3:
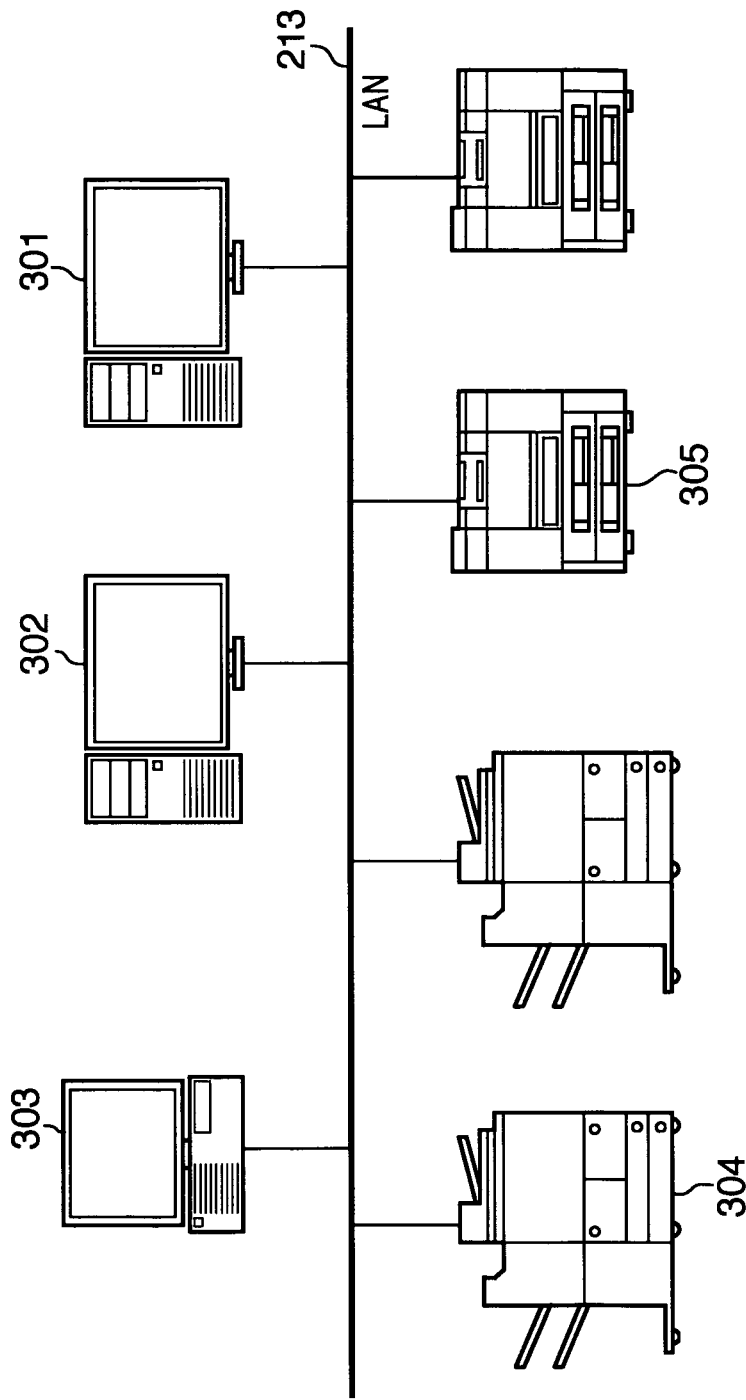
FIG. 3 is a diagram showing a configuration of a network system made up of the host computer shown in FIG. 2 and multiple network devices.

FIG. 3 is a diagram showing a configuration of a network system made up of the host computers shown in FIG. 2 and multiple network devices. As shown in FIG. 3, the LAN 213 of the network system is connected with multiple host computers 301, 302, and 303, digital multifunction peripherals 304, and printing devices 305.

Network device management software runs on the host computers 301 and 302. A Web browser used to operate the network device management software runs on the host computer 303. A network administrator or other user of the network device management software uses the network device management software running on the host computers 301 and 302, via the Web browser running on the host computer 303. Also, the network device management software monitors the digital multifunction peripherals 304 and printing devices 305 connected to the LAN 213 and makes settings for them by communicating with them.

Figure 4:
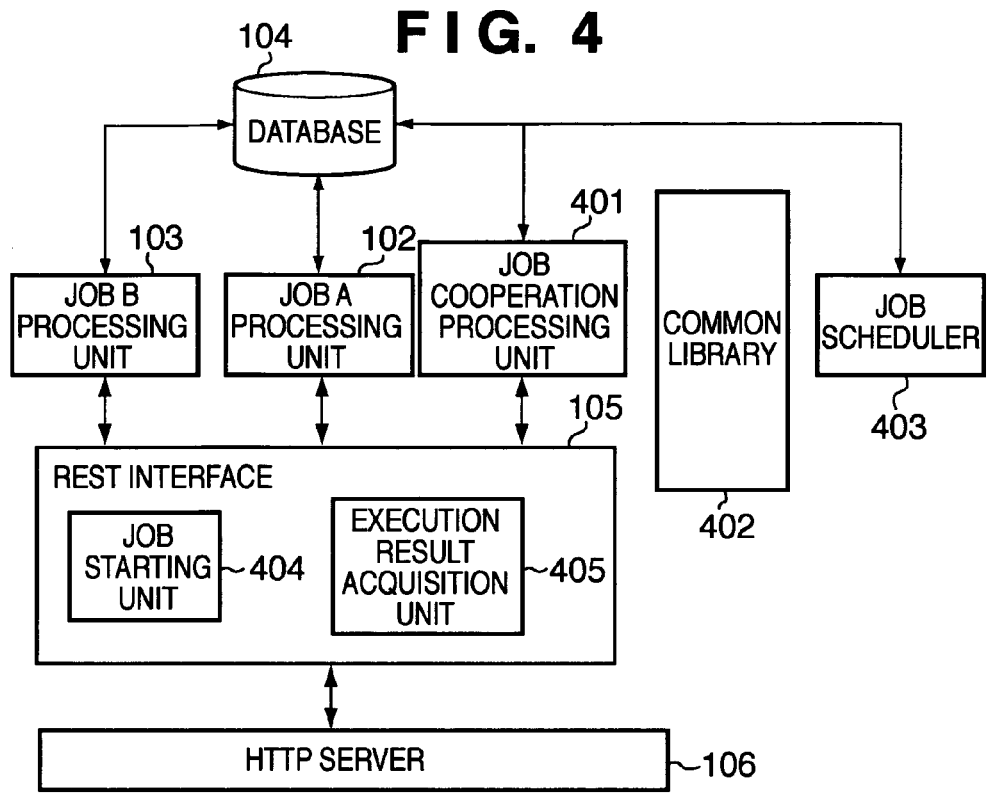
FIG. 4 is a block diagram redescribing the conceptual diagram of FIG. 1 in detail according to an implementation.

FIG. 4 is a block diagram redescribing the conceptual diagram of FIG. 1 in detail according to an implementation. In FIG. 4, a job cooperation processing unit 401 is equivalent to the job execution control unit 101, and is so referred to here because it is implemented as a "module which controls execution of multiple jobs." A common library 402 of the network device management software provides access to the database 104 as well as provides common components of Web user interfaces. A job scheduler 403 resides in the system and starts a specified job at a specified time.

A job starting unit 404 in the REST interface 105 is a module which interprets a REST Web service for job startup received via the HTTP server 106 and starts the job. An execution result acquisition unit 405 is a module which interprets a REST Web service for acquisition of job execution result details and acquires the job execution result details.

The job scheduler 403 periodically monitors schedule information stored in the database 104 and starts a registered job which falls due to be executed. The registered job is started either by a Web server via HTTP or by the job starting unit 404 via the REST interface 105. In so doing, a registered-job ID is stored in a URI parameter or the text of an HTTP request. An example of a URI for job startup using a REST Web service is shown below.

https://192.168.0.12/NDM/ExecuteJob/10 where "192.168.0.12" is the IP address of the host 301 on which the network device management software runs, "10" is the registered-job ID of the job to be started, "NDM" is a basic path of the network device management software, and "ExecuteJob" is a path of the REST Web service used to give an instruction to execute the job.

However, with this alone, a third party can easily create an HTTP request for job startup. Thus, a mechanism has been introduced to guarantee that a given request has been issued by the network device management software and that the content has not been falsified. Furthermore, a URI parameter is added as required.

A job start request is passed from the HTTP server 106 to the REST interface 105. Upon determining that the request is a job start request, the REST interface 105 transfers processing to the job starting unit 404. Consequently, the job starting unit 404 initiates a job starting process according to the request. Also, the job starting unit 404 returns an executed-job ID of the registered job after the execution to the caller and the REST interface 105 returns value of the executed-job ID as an HTTP response to the sender of the HTTP request.

Figure 5:
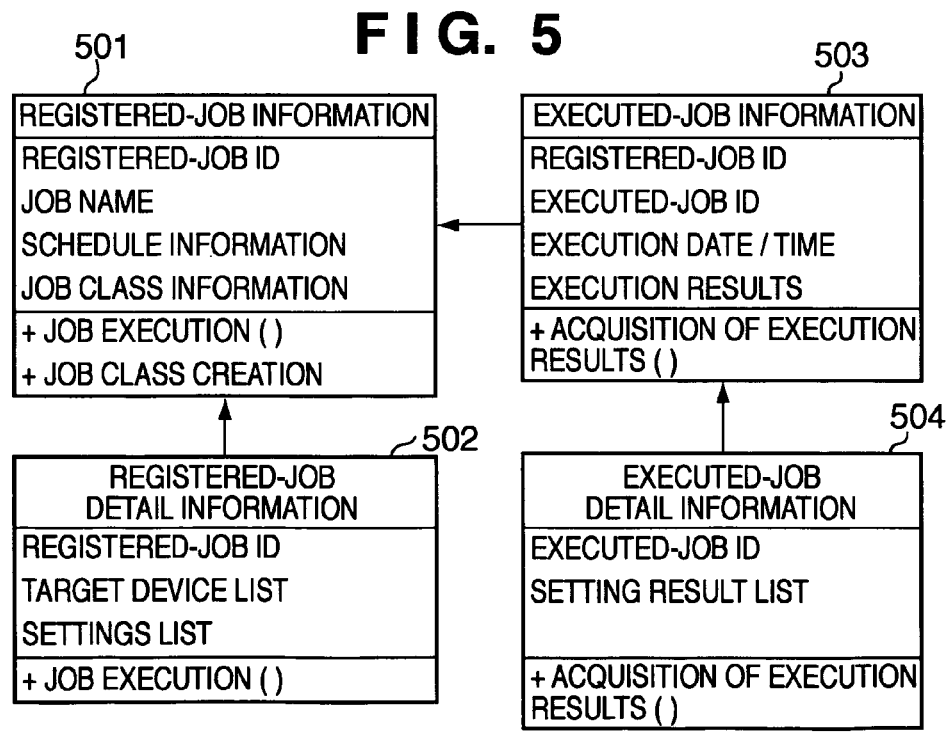
FIG. 5 is a UML (unified modeling language) class diagram of a part related to a job.

Next, UML (unified modeling language) classes of a part related to a job will be described with reference to FIG. 5. A registered-job information class 501 holds common items of registered jobs held by the network device management software and implements processing of registered jobs. The common items of registered jobs are stored in the database 104. The common items include a registered-job ID which uniquely identifies a registered job, a job name given to the job by the user, schedule information which specifies execution date/time of the job, job class information (see FIG. 6) about a process class which actually processes the job.

The process class is generated dynamically when a job class creation method of the registered-job information class 501 is called. The schedule information can be specified in the form of date/time such as 8:30 AM on Oct. 13, 2009 or periodic execution such as 10:20 PM every Friday. On the other hand, jobs executed indirectly by the job cooperation processing unit 401 do not have schedule information in some cases. The registered-job information class 501 further includes a method for executing the job represented by the registered-job ID.

A registered-job detail information class 502 holds detailed information about a registered job contained, for example, in the job A processing unit 102 and actually executes the job. The registered-job detail information class 502 is prepared individually by a provider of each job. For example, different registered-job detail information classes are implemented for job A and job B. The registered-job detail information class 502 holds, for example, a registered-job ID and detailed information about the job associated with the registered-job ID. The detailed information about a job contains, for example, a list of identifiers which uniquely identify network devices handled by the job and a list of settings made to each of the network devices. The information is stored in the database 104. Furthermore, a job execution method is called to execute the job according to the detailed information. In this example, settings are delivered to the respective network devices in the list.

An executed-job information class 503, which implements processing of executed jobs, holds information concerning already executed jobs and common to different pieces of network device management software. The information is stored in the database 104. The stored information contains the registered-job ID of the executed job, the executed-job ID which uniquely identifies the executed job, the date/time the job was executed, and execution results of the job. The executed-job information class 503 also implements a method for acquiring execution result details of the executed job represented by the executed-job ID.

An executed-job detail information class 504 holds execution result details of an executed job contained, for example, in the job A processing unit 102 and returns the execution result details. The executed-job detail information class 504 is prepared individually by a provider of each job. For example, different executed-job detail information classes are implemented for job A and job B. The executed-job detail information class 504 holds, for example, an executed-job ID and detailed information of the executed job, where the executed-job ID uniquely identifies the executed job. The execution result details of the executed job includes, for example, a list of devices set successfully, a list of devices set unsuccessfully, causes of the successes/failures, and so on. The execution result details are stored in the database 104.

Figure 6:
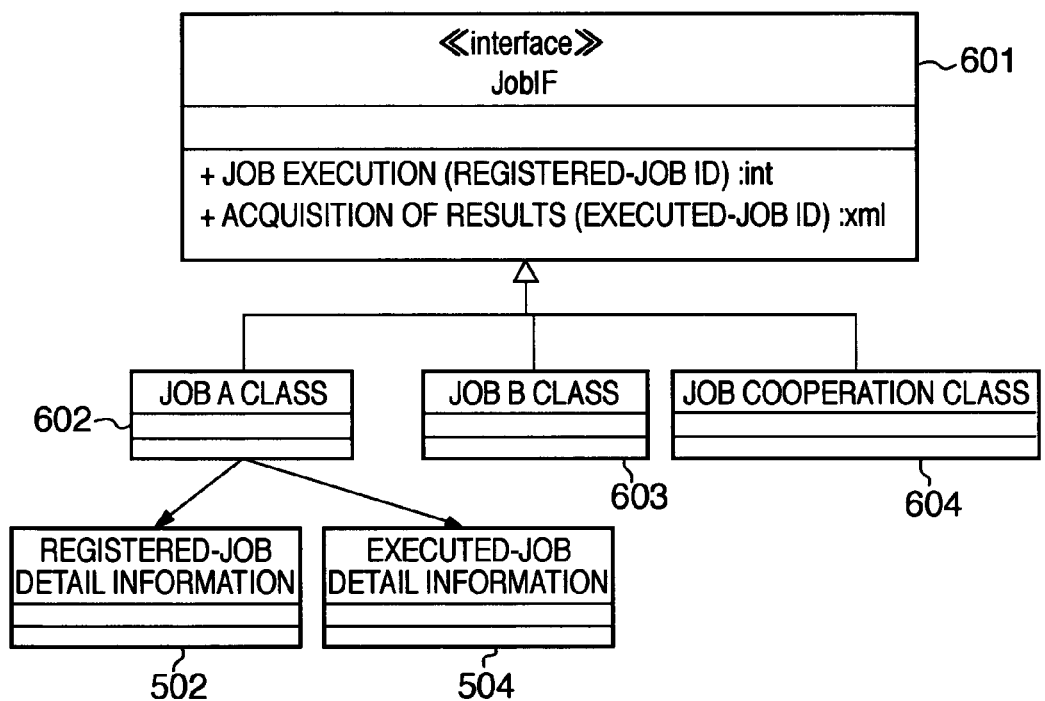
FIG. 6 is a UML class diagram showing an interface implemented by each job processing unit.

FIG. 6 is a UML class diagram showing an interface implemented by each job processing unit. Each job processing unit is always required to include a class which implements a JobIF interface 601. Classes 602, 603, and 604 are included in the job A processing unit 102, job B processing unit 103, and job cooperation processing unit 401, implementing a JobIF interface class 601. Information about these classes is described in information concerning the classes which actually process the jobs and contained in the registered-job information class 501 shown in FIG. 5. A job execution method defined by the JobIF interface class 601 executes the job having the registered-job ID specified by an argument and returns the executed-job ID which uniquely identifies the executed job.

Also, a result acquisition method defined by the JobIF interface class 601 returns the execution result details of the job having the executed-job ID specified by an argument, in XML format. Each method creates instances of the registered-job detail information class 502 and executed-job detail information class 504 and transfer processing to these classes.

Figure 7:
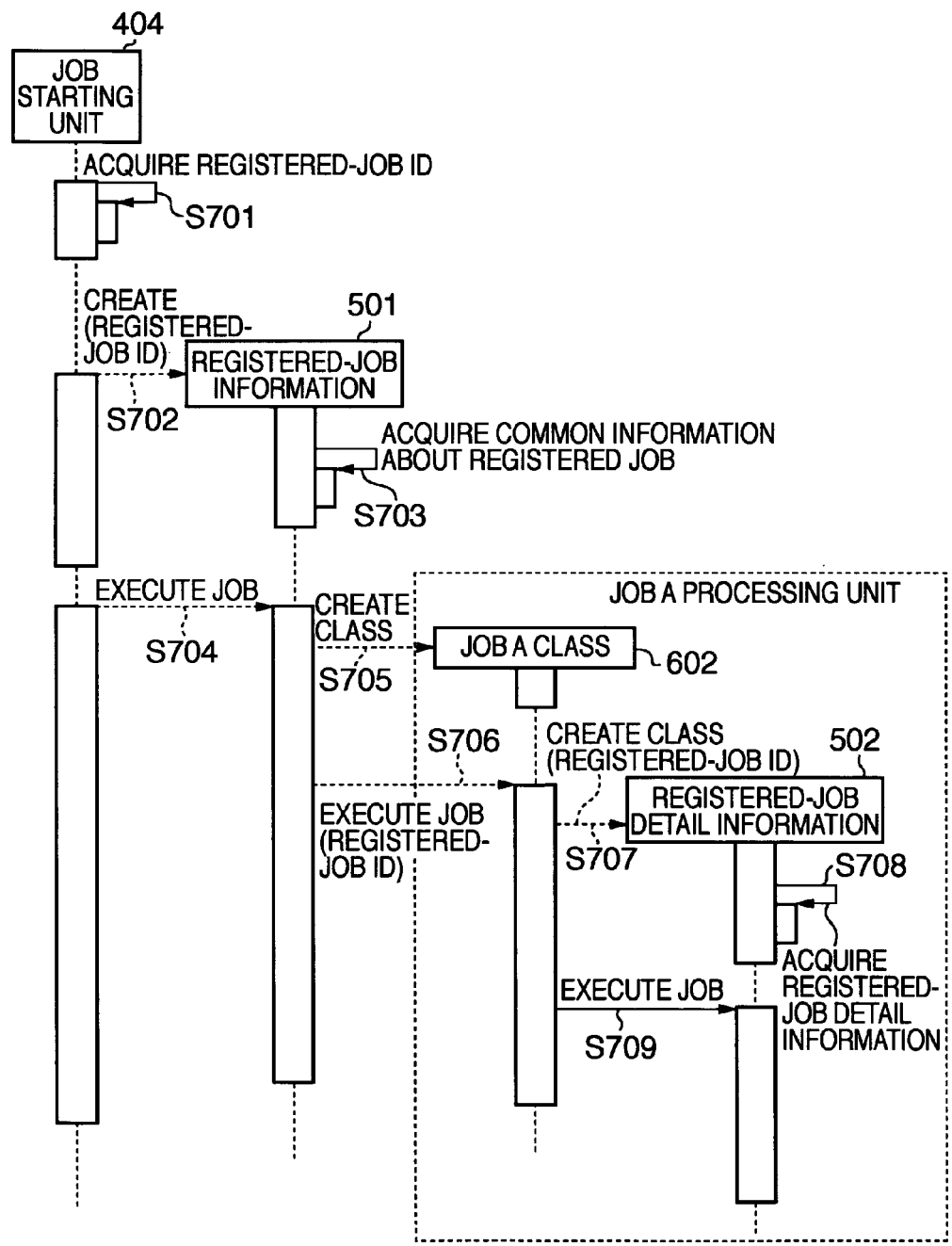
FIG. 7 is a UML sequence diagram showing a flow of a job starting process.

FIG. 7 is a UML sequence diagram showing a flow of a job starting process. First, in S701, the job starting unit 404 analyzes a URI and an HTTP request and acquires an appropriate registered-job ID. In S702, the job starting unit 404 creates a registered-job information class 501 using the acquired registered-job ID as an argument. In S703, during class creation, the created registered-job information class 501 acquires common information about the registered job related to the registered-job ID from the database 104.

Next, in S704, the job starting unit 404 instructs the created registered-job information class 501 to execute the job. In S705, based on the information concerning the class which actually processes the job and contained in the registered-job information class 501, the registered-job information class 501 creates a class which implements a JobIF interface class 601 in order to execute the job having the registered-job ID. In this example, since the job represented by the executed-job ID is a job A, the registered-job information class 501 generates a job A class 602.

After generating the job A class 602, in S706, the registered-job information class 501 calls the job execution method of the JobIF interface 601 implemented by the created job A class 602. Upon receiving the job execution call, in S707, the job A class 602 creates a registered-job detail information class 502 which implements job execution. In S708, the created registered-job detail information class 502 acquires registered-job detail information from the database 104. Then, in S709, the job A class 602 calls the job execution method of the generated registered-job detail information class 502 and thereby starts the specified registered job.

The above is the process flow which takes place from the time when the REST interface 105 receives an HTTP request for job execution to the time when the job is actually executed. Incidentally, error handling is omitted in the sequence diagram illustrated above.

Figure 8:
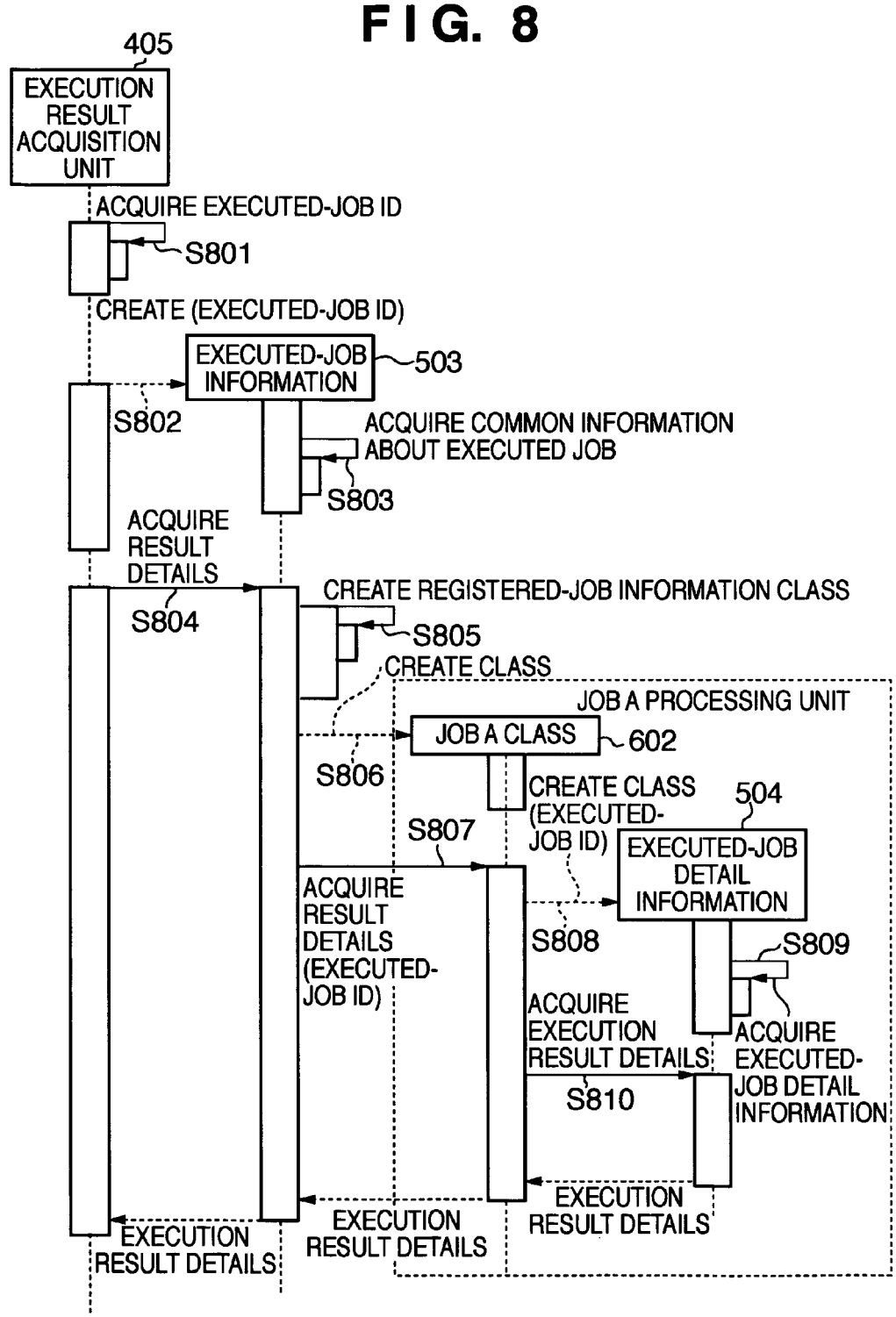
FIG. 8 is a UML sequence diagram showing a flow of a process for returning execution result details of an executed job.

FIG. 8 is a UML sequence diagram showing a flow of a process for returning execution result details of an executed job. An example of a URI for acquisition of job execution result details using a REST Web service is shown below.

https://192.168.0.12/NDM/JobResult/38 where "192.168.0.12" is the IP address of the host computer 301 on which the network device management software runs, "38" is the executed-job ID of the executed job whose execution result details are to be acquired, "NDM" is a basic path of the network device management software, and "JobResult" is a path of the REST Web service used to give an instruction to acquire job execution result details. Upon receiving the HTTP request, the HTTP server 106 transfers processing to the REST interface 105. The REST interface 105 checks the URI path of the HTTP request. If the HTTP request specifies job execution result details, the REST interface 105 transfers processing to the execution result acquisition unit 405.

First, in S801, the execution result acquisition unit 405 analyzes a URI and an HTTP request and acquires an appropriate executed-job ID. In this case, the executed-job ID is "38." Next, in S802, the execution result acquisition unit 405 creates an executed-job information class 503 having the acquired executed-job ID. After that, in S803, creation unit of the executed-job information class 503 acquires common information about the executed job related to the specified executed-job ID from the database 104. The common information includes the registered-job ID related to the executed job, the date/time the job was executed, and execution results of the job.

In S804, the execution result acquisition unit 405 calls an execution result acquisition method of the created executed-job information class 503. In the class creation step of S805, the executed-job information class 503 creates a registered-job information class 501 related to the acquired registered-job ID (the created registered-job information class is not shown). In S806, the executed-job information class 503 calls the job class creation method of the created registered-job information class and thereby creates a job A class 602 which implements the JobIF interface 601 related to the specified executed-job.

Next, in S807, the executed-job information class 503 calls the result acquisition method of the JobIF interface 601 implemented by the created job A class 602. In S808, the called result acquisition method of the job A class 602 creates an executed-job detail information class 504 related to the specified executed-job ID. Upon creation, the executed-job detail information class 504 acquires, in S809, the job execution result details related to the assigned executed-job ID from the database 104.

In S810, the job A class 602 calls an execution result detail acquisition method of the created executed-job detail information class 504. The executed-job detail information class 504 returns execution result details as a character string in XML format to the execution result detail acquisition method. The returned XML character string of the execution result details is returned as it is to the executed-job information class 504 and the execution result acquisition unit 405. Then, the execution result acquisition unit 405 returns the execution result details to the sender of the HTTP request.

The above is the process flow which takes place from the time when the REST interface 105 receives an HTTP request for acquisition of job execution result details to the time when the job execution result details is actually returned. Incidentally, error handling is omitted in the sequence diagram illustrated above.

FIG. 9 is an example of XML including job execution result details returned by network device management software using a REST Web service for acquiring execution result details. In this example, a device with a device identifier of 00008523cd4d and device with a device identifier of 000085437822 have been processed successfully while a device with a device identifier of 00008572dc23 has been processed unsuccessfully, where the device identifier uniquely identifies a network device.

Specifically, the Id elements in the XML path TaskResult/SucceededDevices/Device indicate the identifiers of the successful devices. On the other hand, the Id element in the XML path TaskResult/FailedDevices/Device indicates the identifier of the unsuccessful device.

Besides the Id elements, any XML element can be added to the execution result detail acquisition method for each individual job. In this example, an IPAddress has been added to a TaskInformation and Device node.

Now, an example of an UI used to define an execution method for the job cooperation processing unit 401 to execute multiple jobs will be described with reference to FIG. 10. FIG. 11 is a flowchart showing processing of two jobs executed via the exemplary UI shown in FIG. 10. In S1101, the job cooperation processing unit 401 executes an address book backup job. Next, in S1102, job execution results are checked. If it is determined that processing has ended normally or partially (processing with respect to part of devices has succeeded and processing with respect to the rest of the devices has failed), the flow goes to S1103 to execute an address book setting job for a next address book. In the address book setting job, an address book setting process is performed only for the devices for which the preceding job, i.e., the address book backup job, has been successful. On the other hand, if it is determined in S1102 that processing has ended abnormally or canceled, the cooperative job processing is terminated.

The address book as referred to herein contains, for example, telephone numbers and e-mail addresses stored in the digital multifunction peripherals 304, where the telephone numbers are used for facsimile transmission and the e-mail addresses are used to e-mail scanned images. It is assumed that the address book in the digital multifunction peripheral is readable and writable from hosts on the network. In this example, the address book backup and address book setting are jobs executed, for example, by the job A processing unit 102 or job B processing unit 103.

If an item "execute the next job regardless of execution results" has been selected as an "execution condition for the next job" on the UI shown in FIG. 10, the job cooperation processing unit 401 selects job 2 regardless of the execution result of job 1. Also, if an item "device irrelevant to the present job" has been selected as a "target of the next job," the job cooperation processing unit 401 instructs the job specified as job 2 to select a target device defined independently by job 2 as a target of the job.

When a press of an "add the job" button is detected, a job setting UI is newly inserted after the job for which the button is provided. In this example, a job setting UI for job 3 is added after job 2.

FIG. 12 is a diagram showing another example of an UI used to define an execution method for multiple jobs. In this example, after firmware delivery, an address book backup is performed for the devices to which firmware has been delivered successfully. Also, the series of processes specified on the UI in this example includes the process of rebooting the devices to which the firmware has been delivered successfully to enable the delivered firmware.

FIG. 13A is a diagram showing data (job cooperation definition data) which, being stored in the database 104, defines job cooperation. "Job number" indicates the order of registered jobs in the job cooperation. "Registered-job ID" indicates the registered-job ID of each of the cooperated jobs. In this example, a registered-job ID of 23 is assigned to firmware delivery, 42 is assigned to address book backup, and 13 is assigned to device reboot. "Execution condition for next job" indicates a condition for execution of the next job. In this example, it can be read that when the execution result of the job with a registered-job ID of 23 is normal end (N) or partial end (P), the job with a job number of 2 is executed. Other available conditions include abnormal end (E) and cancel (A). When the "execution condition for next job" is left empty, the next job is executed regardless of the execution result of the current job.

"Target device" specifies a device targeted for processing in the job. Available values are "J" indicating the device specified by the registered job, "S" indicating the device successfully processed by the job represented by the job number of the target device, "F" indicating the device unsuccessfully processed by the job, and "A" indicating all the devices processed by the job. One of these values can be specified for each job. In this example, the target device of the job with a job number of 1 is the device specified by the registered job while the target device of the jobs with a job number of 2 or 3 is the device successfully processed by the job with a job number of 1.

Figure 14:
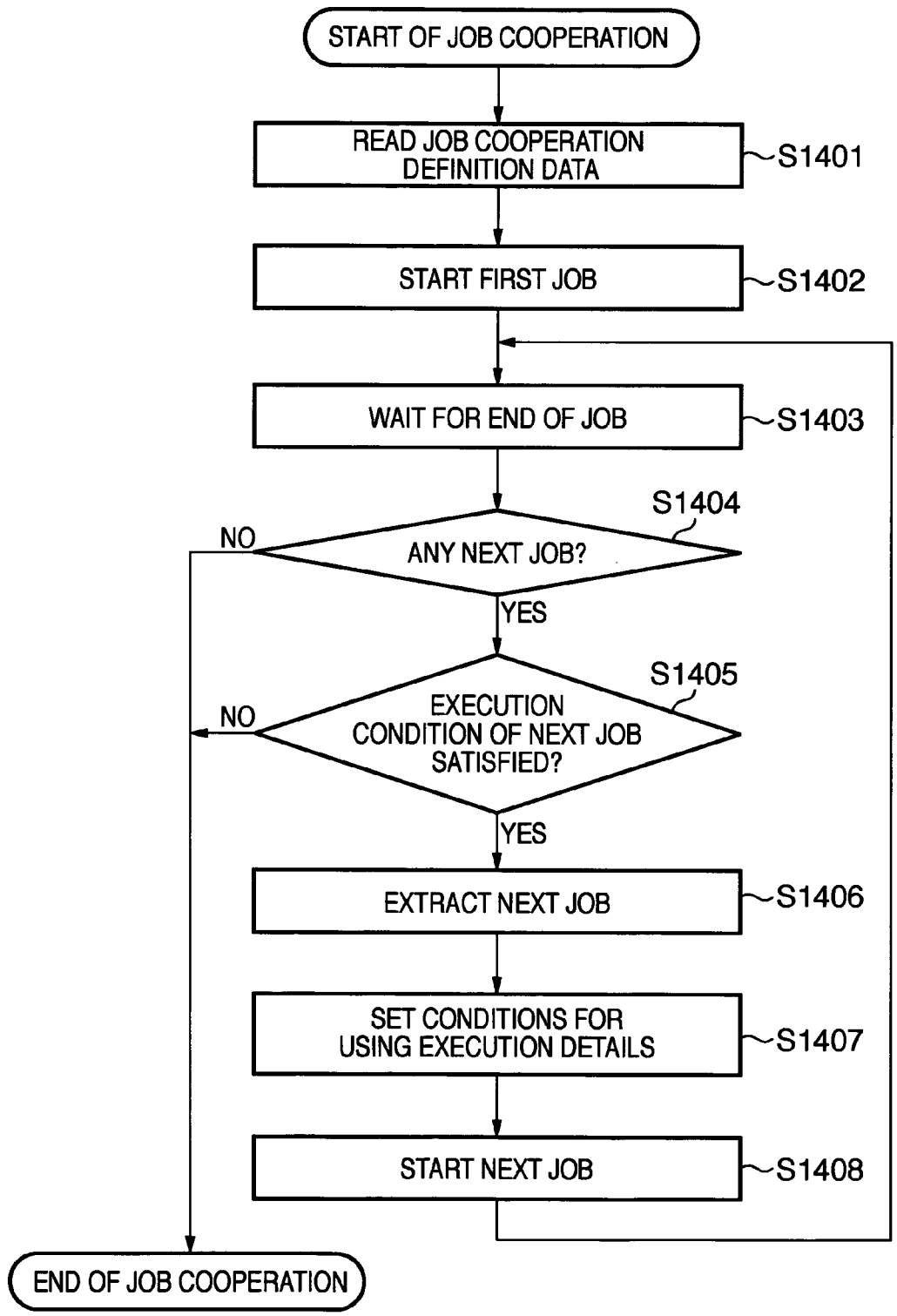
FIG. 14 is a flowchart showing a job cooperation process performed by the job cooperation processing unit 401 which controls execution of multiple jobs.

FIG. 14 is a flowchart showing a job cooperation process performed by the job cooperation processing unit 401 which controls execution of multiple jobs. The job cooperation definition data shown in FIG. 13A will be used in the following description for the sake of convenience.

In S1401, the job cooperation processing unit 401 acquires data (job cooperation definition data) which defines specified job cooperation from the database 104. Next, in S1402, the job cooperation processing unit 401 gives an instruction to execute the first job in the acquired job cooperation definition data. In this example, the job to be executed first is a firmware delivery job with a registered-job ID of 23. The job cooperation processing unit 401 calls, for example, the following URI and thereby gives an instruction to execute the job.

https://192.168.0.12/NDM/ExecuteJob/23

In response to the call, the job starting unit 404 starts the specified registered job and returns the executed-job ID which uniquely identifies the executed job to the caller. Consequently, the job cooperation processing unit 401 receives the executed-job ID. In S1403, the job cooperation processing unit 401 periodically acquires the executed-job information class 503 related to the received executed-job ID from the database 104, to detect termination of the job execution. When termination of the job execution is confirmed, the job cooperation processing unit 401 checks the job cooperation definition data in S1404. If there is no next job, the job cooperation processing unit terminates the job cooperation process.

If there is a next job, the job cooperation processing unit 401 compares the execution result of the job with the execution condition of the next job in the job cooperation definition data in S1405. If it is found that the execution result of the job does not satisfy the execution condition of the next job, the job cooperation processing unit 401 terminates the job cooperation process.

On the other hand, if the execution result satisfies the execution condition of the next job, the job cooperation processing unit 401 extracts information on the next registered job from the job cooperation definition data in S1406. The job cooperation processing unit 401 sets the extracted information on the target device of the next registered job in S1407 and starts the next registered job in S1408. When the second job is executed using the job cooperation definition data shown in FIG. 13A, if the executed-job ID of the first job is 152, an URI used for execution of the second registered job is as follows.

https://192.168.0.12/NDM/ExecuteJob/ 42?uri=https%3A%2F%2F192.168.0.12%2FNDM%2FJobResult%2F152&target=s In the URI, the value of the parameter "uri" is "https:// 192.168.0.12/NDM/JobResult/152" and value of the parameter "target" is "s". This means that the result of the executed job is acquired from https://192.168.0.12/NDM/JobResult/ 152 and that the job whose registered-job ID is 42 is executed for the successful device(s). A value of "f" for the "target" parameter indicates an unsuccessful device and a value of "a" indicates all the devices. On the other hand, if the URI parameter "target" or "uri" does not exist, the device defined independently by the job represented by the registered-job ID is designated as a target of the job.

After starting the job in S1408, the job cooperation processing unit 401 returns to S1403 where the job cooperation processing unit 401 waits until the started job ends. Subsequently, the job cooperation processing unit 401 repeats similar processes.

Figure 15:
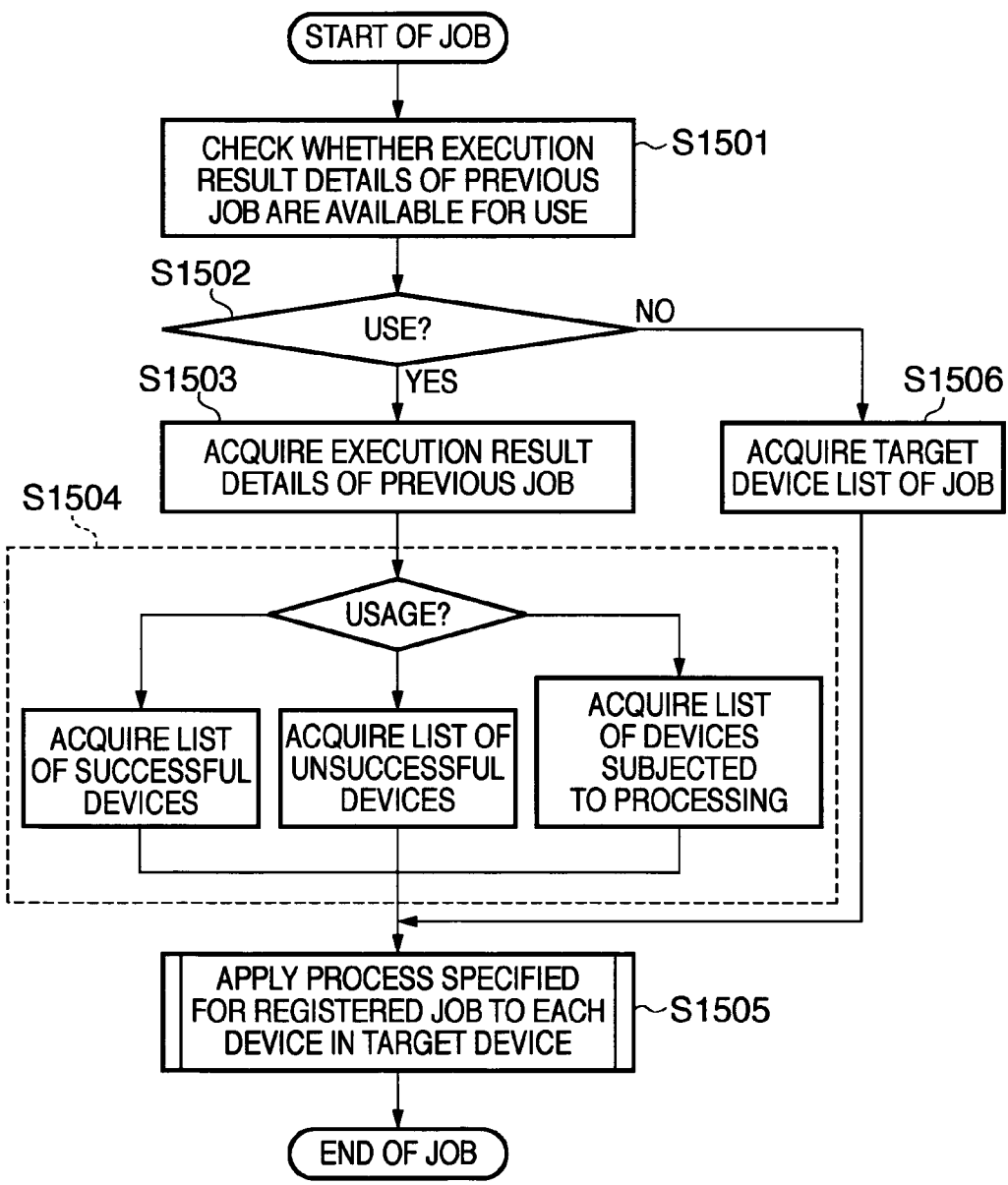
FIG. 15 is a flowchart showing a process flow of a job A processing unit 102 and job B processing unit 103.

FIG. 15 is a flowchart showing a process flow of the job A processing unit 102 and job B processing unit 103. The process is performed by the registered-job detail information class 502 when the job execution method is called in S709 shown in FIG. 7. Although no argument used in the call is shown in FIG. 7, it is assumed that the URI used to acquire the job result details and information on the device set as a target of the job in the job result details have been specified as arguments. Also, it is assumed that the arguments are specified in addition to the registered-job ID in the call in S706.

In S1501, the registered-job detail information class 502 checks whether or not the execution result details of a previous job already executed are available for use. Then, in S1502, the registered-job detail information class 502 makes a decision whether to use the execution result details. If a URI used to acquire the job result details have been specified and if the value which indicates the target device is "s," "f," or "a," the registered-job detail information class 502 determines whether to use the execution result of the already executed job.

Specifically, when the execution result is used, the registered-job detail information class 502 acquires the execution result details of the already executed job by issuing a request therefor to the appropriate URI in S1503. On the other hand, when the execution result of the already executed job is not used, the registered-job detail information class 502 designates the device specified by the registered job as a target device of the job in S1506.

Next, in S1504, the registered-job detail information class 502 extracts successful devices, unsuccessful devices, and devices subjected to processing from the acquired execution result details according to the type of the given target device and designates them as target devices of the job. Finally, in S1505, the registered-job detail information class 502 performs the specified process with respect to the target devices determined in S1504 or S1506, and thereby finishes the job.

The above procedures make it possible to provide information about an already executed job to the job to be executed next, allowing the next job to acquire the execution result details of the already executed job. The procedures also make it possible to specify usage of the execution result details of the already executed job, allowing the next job to extract data which matches the specified usage from the execution result details according to instructions.

Second Embodiment

According to the first embodiment, the job cooperation processing unit 401 and the job processing units (job A processing unit 102 and job B processing unit 103) called by the job cooperation processing unit 401 to execute registered jobs are running on the same host computer. According to the first embodiment, both the method for executing a registered job and method for acquiring the result details of an executed job are a URI call by HTTP. Therefore, such a call can be made even if the job cooperation processing unit and job processing units exist on different host computers.

Suppose, for example, network device management software is running on each of the host computers 301 and 302 shown in FIG. 3. It is assumed that there is also a storage device which stores other network device management software running on the network and a device which allows the host computers 301 and 302 to acquire a list of registered jobs from each other's network device management software. Also, it is assumed that an HTTP request to the URI shown below can be used to acquire the list of registered jobs from the network device management software running on a host with an IP address of 192.168.0.38. Incidentally, the list of registered jobs contains at least the registered-job ID and registered-job name of each registered job.

https://192.168.0.38/NDM/RegisteredJob/

FIG. 16 is a diagram showing an extended version of the UI used to define an execution method for multiple jobs shown in FIG. 12, where the extended version allows the user to specify a job registered with different network device management software. In FIG. 16, the box captioned "system name" lists stored pieces of network device management software running on the network, including the network device management software. The user selects a desired piece of network device management software from the list captioned "system name" and thereby causes a list of jobs registered with the selected network device management software to be displayed as a job name selection list.

FIG. 13B shows an example of data which, being stored in a database, defines job cooperation, according to a second embodiment. Besides the data shown in FIG. 13A, a system ID column is added. FIG. 13C shows an example of database data which define system IDs. Using a combination of FIGS. 13B and 13C, a registered job with a job number of 2, for example, can be started.

Specifically an HTTP request is transmitted to https://192.168.9.38/NDM/ExecuteJob/42. Incidentally, a URI used to acquire the execution result details of an already executed job and a URI parameter "target" which indicates an application method are omitted here for the sake of simplicity.

Using the above procedures, the job execution control unit which controls execution of multiple jobs can cooperate registered jobs on different hosts with each other.

Third Embodiment

The first embodiment implements job cooperation for applying the execution result details of a registered job specified via the UI (FIG. 10 or FIG. 11) provided by the job cooperation processing unit to the next registered job. However, the method which involves indicating the execution result details of an already executed job to a registered job so that the registered job will acquire the execution result details of the already executed job at the time of execution is not limited to the case where the already executed job has been executed in the job cooperation process. That is, the execution result detail of any executed job can be applied to any registered job.

In the third embodiment, as an example of applying the execution result details of an already executed job to a registered job, a description will be given of a method for implementing a capability to execute the same as an already executed job with respect to devices processed unsuccessful in the already executed job. This process will be referred to herein as "recovery."

Figures 17, 18:
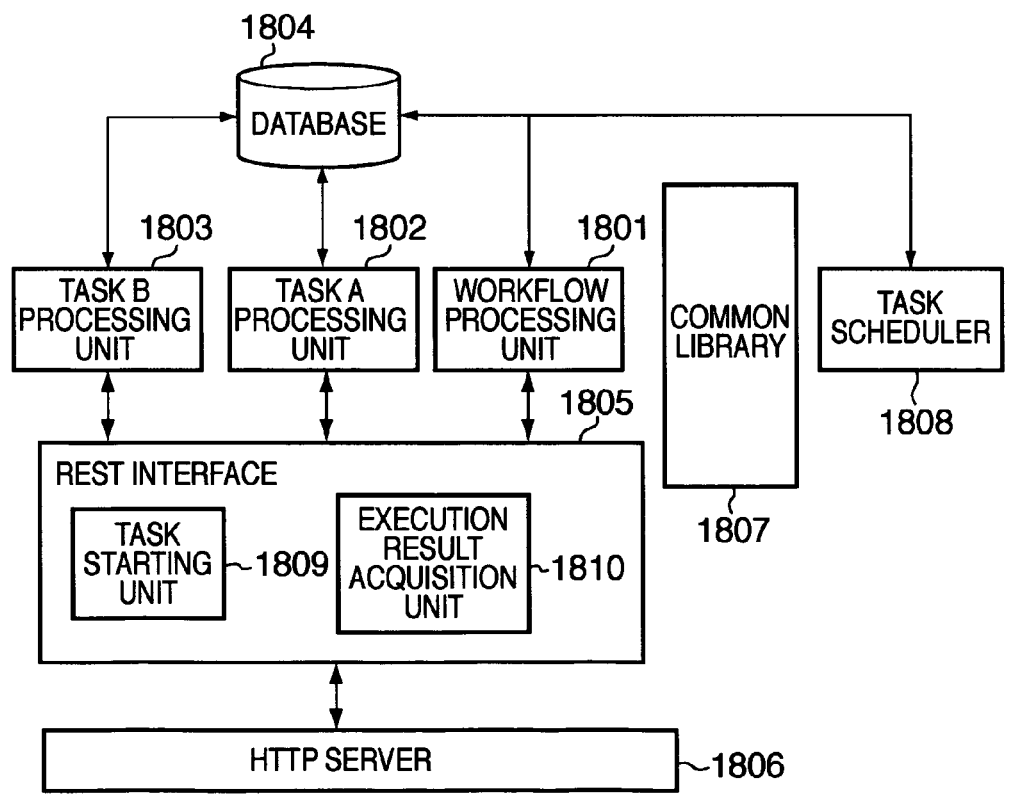
FIG. 17 is a diagram showing an example of a screen which displays a list of executed jobs.
FIG. 18 is a diagram showing a configuration of a workflow system according to a fourth embodiment.

FIG. 17 is a diagram showing an example of a screen which displays a list of executed jobs. In FIG. 17, the name, status, and execution date/time of jobs are listed. Execution result and recovery links are displayed in the status field. When a user's click on an execution result link is detected, an executed-job list display unit displays execution result details of a specified job. When a user's click on a recovery link is detected, the executed-job list display unit acquires a registered-job ID from the executed-job information class 503 related to a specified executed-job ID. Based on the acquired registered-job ID and executed-job ID, the executed-job list display unit transmits an HTTP request to the following URI to execute a registration job with respect to the unsuccessful device having the execution result details identified by the specified executed-job ID.

https://localhost/NDM/ExecuteJob/62?uri=https%3A%2F%2Flocalhost%2FNDM%2FJobResult%2F142&target=f where the registered-job ID and executed-job ID are 62 and 142, respectively. Consequently, the same job can be repeated for the device unsuccessfully processed by the executed job.

Fourth Embodiment

Cooperative device job management has been described above as an embodiment of a cloud computing system, and in a fourth embodiment, asynchronous execution of a workflow will be described as an example. According to the fourth embodiment, the workflow is executed by a general-purpose computer (see, for example, FIG. 2), which is connected with multiple devices (see, for example, FIG. 3) on the network.

FIG. 18 is a diagram showing a configuration of a workflow system according to the fourth embodiment. In FIG. 18, a workflow processing unit 1801 controls execution of a workflow service provided by multiple tasks. A task A processing unit 1802 and task B processing unit 1803 controlled by the workflow processing unit 1801 concern tasks which provide different types of Web service. The Web services are resource-oriented services open to the public, and are not particularly limited. A database 1804 stores execution conditions of multiple tasks, execution details of each task, and execution result details of each task.

A task starting unit 1809 in a REST interface 1805 is a module which interprets a REST Web service for task startup received via an HTTP server 1806 and starts the task. An execution result acquisition unit 1810 is a module which interprets a REST Web service for acquisition of task execution result details and acquires the task execution result details.

A common library 1807 provides access to a database 1804 as well as provides common components of Web user interfaces. A task scheduler 1808 periodically monitors schedule information stored in the database 1804 and starts a registered task which falls due to be executed. The registered task is started either by a Web server via HTTP or by the task starting unit 1809 via the REST interface 1805.

In the above configuration, the workflow processing unit 1801 acquires execution results of the preceding task and executes the subsequent task if the execution results satisfy predetermined execution conditions of the subsequent task.

The fourth embodiment makes it possible to provide information about an already executed task to the task to be executed next, allowing the next task to acquire the execution result details of the already executed task. The fourth embodiment also makes it possible to specify usage of the execution result details of the already executed task, allowing the next task to extract data which matches the specified usage from the execution result details according to instructions.

The configuration according to the fourth embodiment can also be applied to the second and third embodiments. This allows tasks on different computers to start each other.

Also, the same task can be repeated for the device unsuccessfully processed by an executed task.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001572, filed Jan. 6, 2010, which is hereby incorporated by reference herein in its entirety.

The invention claimed is:

1. A processing method for a control apparatus which can control execution of a subsequent job subsequent to a preceding job having a processing content different from the subsequent job based on results of executing the preceding job when executing a plurality of jobs cooperated as job cooperation, the method comprising:
    displaying a control screen for setting execution conditions for executing a subsequent job;
    holding an execution result obtained by executing the preceding job;
    acquiring the execution result held in the holding step according to a request using a URI (Uniform Resource Identifier) for acquiring an execution result of a job at the control apparatus by a web service, wherein the request includes a designation of identification information of the preceding job; and
    controlling the subsequent job subsequent to the preceding job based on the execution result acquired in the acquiring step and the execution conditions set via the control screen,
    wherein in the control screen, at least one of a normal end indicating success of process for all of target devices, a partial end indicating success of process for a part of the target devices and failure of process for the rest of the target devices, and an abnormal end indicating failure of process for the target devices, which can be an execution result of a preceding job, can be designated as the execution conditions, and
    wherein if both of the normal end and the partial end are designated as the execution conditions, the subsequent job subsequent to the preceding job is executed for the target devices even though the execution result acquired in the acquiring step indicates either the normal end or the partial end.

2. The method according to claim 1, wherein each job is started by a URI adapted to specify each job based on job cooperation definition data which defines the job cooperation.

3. The method according to claim 2, wherein the job cooperation definition data includes an identifier which uniquely identifies a network device handled by the preceding job and settings made to each network device.

4. The method according to claim 1, further comprising indicating an application method of the execution result to the subsequent job.

5. A non-transitory computer-readable recording medium containing a program which causes a computer to perform the processing method for a control apparatus according to claim 1.

6. A processing method for a control apparatus which can control execution of a subsequent task subsequent to a preceding task having a processing content different from the subsequent task based on results of executing the preceding task when executing a workflow service provided by a plurality of tasks, the method comprising:
    displaying a control screen for setting execution conditions for executing a subsequent task;
    holding an execution result obtained by executing the preceding task;
    acquiring the execution result held in the holding step according to a request using a URI (Uniform Resource Identifier) for acquiring an execution result of a task at the control apparatus by a web service, wherein the request includes a designation of identification information of the preceding task; and
    controlling the subsequent task subsequent to the preceding task based on the execution result acquired in the acquiring step and the execution conditions set via the control screen,
    wherein in the control screen, at least one of a normal end indicating success of process for all of target devices, a partial end indicating success of process for a part of the target devices and failure of process for the rest of the target devices, and an abnormal end indicating failure of process for the target devices, which can be an execution result of a preceding task, can be designated as the execution conditions, and
    wherein if both of the normal end and the partial end are designated as the execution conditions, the subsequent task subsequent to the preceding task is executed for the target devices even though the execution result acquired in the acquiring step indicates either the normal end or the partial end.

7. A control apparatus which can control execution of a subsequent task subsequent to a preceding task having a processing content different from the subsequent task based on results of executing the preceding task when executing a workflow service provided by a plurality of tasks, comprising:
    a display unit configured to display a control screen for setting execution conditions for executing a subsequent task;
    a holding unit configured to hold an execution result obtained by executing the preceding task;
    an acquiring unit configured to acquire the execution result held by the holding unit according to a request using a URI (Uniform Resource Identifier) for acquiring an execution result of a task at the control apparatus by a web service, wherein the request includes a designation of identification information of the preceding task; and
    a control unit configured to control the subsequent task subsequent to the preceding task based on the execution result acquired by the acquiring unit and the execution conditions set via the control screen,
    wherein in the control screen, at least one of a normal end indicating success of process for all of target devices, a partial end indicating success of process for a part of the target devices and failure of process for the rest of the target devices, and an abnormal end indicating failure of process for the target devices, which can be an execution result of a preceding task, can be designated as the execution conditions, and wherein if both of the normal end and the partial end are designated as the execution conditions, the subsequent task subsequent to the preceding task is executed for the target devices even though the execution result acquired by the acquiring unit indicates either the normal end or the partial end.

8. The method according to claim 6, wherein the workflow service is a Web service which uses REST; each task is started by a URI which specifies each task; and the preceding task and the subsequent task are executed asynchronously.

9. The method according to claim 1,
wherein in the control screen, either a first setting for controlling an execution of a subsequent job regardless of an execution result of a preceding job or a second setting for controlling an execution of a subsequent job in accordance with an execution result of a preceding job can be designated,
wherein if the first setting is designated, in the controlling step, an execution of a subsequent job subsequent to the preceding job is controlled regardless of the execution result acquired in the acquiring step, and
wherein if the second setting is designated, in the control screen, at least one of the normal end, the partial end, and the abnormal end, which can be an execution result of the preceding job, can be designated as the execution conditions.

10. The method according to claim 1, wherein the preceding job is an address book backup job, and the subsequent job is an address book setting job.

11. A non-transitory computer-readable recording medium containing a program which causes a computer to perform the processing method for a control apparatus according to claim 6.

12. The method according to claim 6,
wherein in the control screen, either a first setting for controlling an execution of a subsequent task regardless of an execution result of a preceding task or a second setting for controlling an execution of a subsequent task in accordance with an execution result of a preceding task can be designated,
wherein if the first setting is designated, in the controlling step, an execution of a subsequent task subsequent to the preceding task is controlled regardless of the execution result acquired in the acquiring step, and
wherein if the second setting is designated, in the control screen, at least one of the normal end, the partial end, and the abnormal end, which can be an execution result of the preceding task, can be designated as the execution conditions.

13. A control apparatus which can control execution of a subsequent job subsequent to a preceding job having a processing content different from the subsequent job based on results of executing the preceding job when executing a plurality of jobs cooperated as job cooperation, comprising:
a display unit configured to display a control screen for setting execution conditions for executing a subsequent job;
a holding unit configured to hold an execution result obtained by executing the preceding job;
an acquiring unit configured to acquire the execution result held by the holding unit according to a request using a URI (Uniform Resource Identifier) for acquiring an execution result of a job at the control apparatus by a web service, wherein the request includes a designation of identification information of the preceding job; and
a control unit configured to control the subsequent job subsequent to the preceding job based on the execution result acquired by the acquiring unit and the execution conditions set via the control screen,
wherein in the control screen, at least one of a normal end indicating success of process for all of target devices, a partial end indicating success of process for a part of the target devices and failure of process for the rest of the target devices, and an abnormal end indicating failure of process for the target devices, which can be an execution result of a preceding job, can be designated as the execution conditions, and
wherein if both of the normal end and the partial end are designated as the execution conditions, the subsequent job subsequent to the preceding job is executed for the target devices even though the execution result acquired by the acquiring unit indicates either the normal end or the partial end.

14. The apparatus according to claim 7, wherein the workflow service is a Web service which uses REST; each task is started by a URI which specifies each task; and the preceding task and the subsequent task are executed asynchronously.

15. The method according to claim 1, wherein in the control screen, setting items for setting execution conditions for the subsequent job subsequent to the preceding job is changed in accordance with a processing content of the preceding job or the subsequent job.

16. The method according to claim 1, wherein in the control screen, if execution conditions for a subsequent job are designated, a job of a plurality of jobs that preceded the subsequent job is designatable as the preceding job.

17. The method according to claim 6, wherein in the control screen, setting items for setting execution conditions for a subsequent task subsequent to a preceding task is changed in accordance with a processing content of the preceding task or the subsequent task.

18. The method according to claim 6, wherein in the control screen, if execution conditions for a subsequent task are designated, a task of a plurality of tasks that preceded the subsequent task is designatable as the preceding task.

* * * * *